United States Patent
Yang et al.

(10) Patent No.: US 10,756,940 B2
(45) Date of Patent: Aug. 25, 2020

(54) METHOD AND DEVICE FOR TRANSCEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Hanjun Park, Seoul (KR); Eunsun Kim, Seoul (KR); Seonwook Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/338,019

(22) PCT Filed: Sep. 29, 2017

(86) PCT No.: PCT/KR2017/010944
§ 371 (c)(1),
(2) Date: Mar. 29, 2019

(87) PCT Pub. No.: WO2018/062939
PCT Pub. Date: Apr. 5, 2018

(65) Prior Publication Data
US 2019/0238385 A1    Aug. 1, 2019

Related U.S. Application Data

(60) Provisional application No. 62/411,688, filed on Oct. 23, 2016, provisional application No. 62/404,261, (Continued)

(51) Int. Cl.
*H04L 27/26* (2006.01)
*H04L 5/00* (2006.01)
(Continued)

(52) U.S. Cl.
CPC ........ *H04L 27/2657* (2013.01); *H04L 5/0007* (2013.01); *H04L 5/0053* (2013.01);
(Continued)

(58) Field of Classification Search
CPC ... H04L 27/2657; H04L 27/26; H04L 5/0007; H04L 5/0053; H04L 5/0091;
(Continued)

(56) References Cited

U.S. PATENT DOCUMENTS

2009/0088148 A1    4/2009  Chung et al.
2013/0156120 A1    6/2013  Josiam et al.
(Continued)

OTHER PUBLICATIONS

Huawei, HiSilicon, "Access mechanism for beam based approach", 3GPP TSG RAN WG1 Meeting #86, Aug. 22-26, 2016, R1-166088.
(Continued)

*Primary Examiner* — Candal Elpenord
(74) *Attorney, Agent, or Firm* — Dentons US LLP

(57) ABSTRACT

The present invention relates to a wireless communication system and particularly to a method and a device for the method, the method comprising: a step of receiving a subframe having a control duration configured with a plurality of OFDM symbols; a step of receiving a control channel by monitoring a plurality of control channel candidates in the control duration of the subframe; and a step of performing an operation corresponding to the control channel, wherein, if the plurality of OFDM symbols correspond to multi-beam directions, a plurality of control channel resources constituting each control channel candidate are present only in the same OFDM symbol in the control duration, and if the plurality of OFDM symbols correspond to a single-beam direction, the plurality of control channel
(Continued)

resources constituting each control channel candidate are present across the plurality of OFDM symbols in the control duration.

12 Claims, 14 Drawing Sheets

Related U.S. Application Data filed on Oct. 5, 2016, provisional application No. 62/401,881, filed on Sep. 29, 2016.

(51) Int. Cl.
*H04W 72/04* (2009.01)
*H04W 74/00* (2009.01)

(52) U.S. Cl.
CPC ............ *H04L 5/0091* (2013.01); *H04L 27/26* (2013.01); *H04W 72/042* (2013.01); *H04W 74/006* (2013.01); *H04W 72/0406* (2013.01)

(58) Field of Classification Search
CPC ... H04W 72/02; H04W 72/04; H04W 72/042; H04W 72/006
See application file for complete search history.

(56) References Cited

U.S. PATENT DOCUMENTS

| | | | |
|---|---|---|---|
| 2013/0279356 A1* | 10/2013 | Park | H04L 5/001 370/252 |
| 2015/0200741 A1* | 7/2015 | Liu | H04L 5/0053 370/312 |
| 2017/0332359 A1* | 11/2017 | Tsai | H04W 72/042 |
| 2017/0353234 A1* | 12/2017 | Islam | H04W 56/0015 |
| 2018/0007688 A1* | 1/2018 | Fu | H04W 72/14 |
| 2018/0227074 A1* | 8/2018 | Sun | H04L 1/001 |
| 2018/0310283 A1* | 10/2018 | Deenoo | H04W 72/042 |

OTHER PUBLICATIONS

ZTE Corporation, ZTE Microelectronics, "Discussion on Control Channel Design for NR MIMO", 3GPP TSG RAN WG1 Meeting #86, Aug. 22-26, 2016, R1-166217.

Nokia, Alcatel-Lucent Shanghai Bell, Verizon Wireless, "Multi-Beam Common Control Plane Design", 3GPP TSG-RAN WG1 #86, Aug. 22-26, 2016, R1-167280.

* cited by examiner

FIG. 6
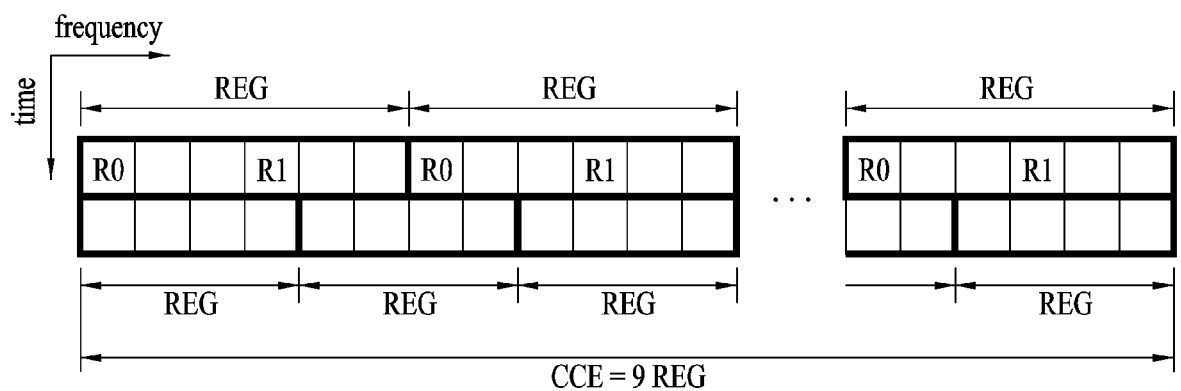
(a) 1 or 2Tx case
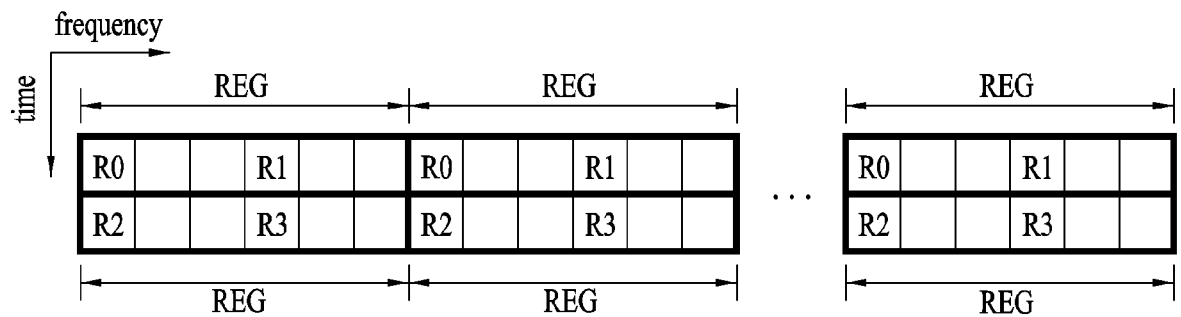
(b) 4Tx case

METHOD AND DEVICE FOR TRANSCEIVING WIRELESS SIGNAL IN WIRELESS COMMUNICATION SYSTEM

This application is the National Phase of PCT International Application No. PCT/KR2017/010944, filed on Sep. 29, 2017, which claims the benefit of U.S. Provisional Application No. 62/401,881, filed on Sep. 29, 2016, 62/404,261, filed on Oct. 5, 2016 and 62/411,688, filed on Oct. 23, 2016, which are all hereby incorporated by reference herein in their entirety.

TECHNICAL FIELD

The present disclosure relates to a wireless communication system, and more particularly, to a method and apparatus for transmitting/receiving a wireless signal. The wireless communication system includes a CA-based (carrier aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present disclosure is to provide a method and apparatus for efficiently transmitting/receiving a wireless signal in a wireless communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a signal at a user equipment (UE) in a wireless communication system includes receiving a subframe having a control duration spanning a plurality of orthogonal frequency division multiplexing (OFDM) symbols, receiving a control channel by monitoring a plurality of control channel candidates in the control duration of the subframe, and performing an operation corresponding to the control channel. If the plurality of OFDM symbols correspond to multiple beam directions, a plurality of control channel resources configuring respective control channel candidates exist only in the same OFDM symbol within the control duration, and if the plurality of OFDM symbols correspond to a single beam direction, the plurality of control channel resources configuring respective control channel candidates exist across the plurality of OFDM symbols in the control duration.

In another aspect of the present disclosure, a UE in a wireless communication system includes a radio frequency (RF) module, and a processor. The processor is configured to receive a subframe having a control duration spanning a plurality of orthogonal frequency division multiplexing (OFDM) symbols, to receive a control channel by monitoring a plurality of control channel candidates in the control duration of the subframe, and to perform an operation corresponding to the control channel. If the plurality of OFDM symbols correspond to multiple beam directions, a plurality of control channel resources configuring respective control channel candidates exist only in the same OFDM symbol within the control duration, and if the plurality of OFDM symbols correspond to a single beam direction, the plurality of control channel resources configuring respective control channel candidates exist across the plurality of OFDM symbols in the control duration.

Preferably, information about beam directions of the plurality of OFDM symbols may be received from a base station (BS), and the plurality of control channel candidates may be monitored on the assumption that the plurality of OFDM symbols correspond to multiple beam directions, until before the information is received.

Preferably, the information may be received in system information, a random access response (RAR), or a radio resource control (RRC) signal.

Preferably, the plurality of control channel resources configuring respective control channel candidates may include a plurality of control resource element groups (c-REGs), and each of the c-REGs may include a plurality of consecutive resource elements (REs) in one OFDM symbol.

Preferably, the plurality of c-REGs may be precoded on a bundled REG (b-REG) basis, and the size of a c-REG may be less than the size of a b-REG.

Preferably, each of the control channel candidates may be distributed on a b-REG basis in the control region.

Advantageous Effects

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the invention and together with the description serve to explain the principles of the disclosure.

FIG. 6 is a resource unit for constructing a control region.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
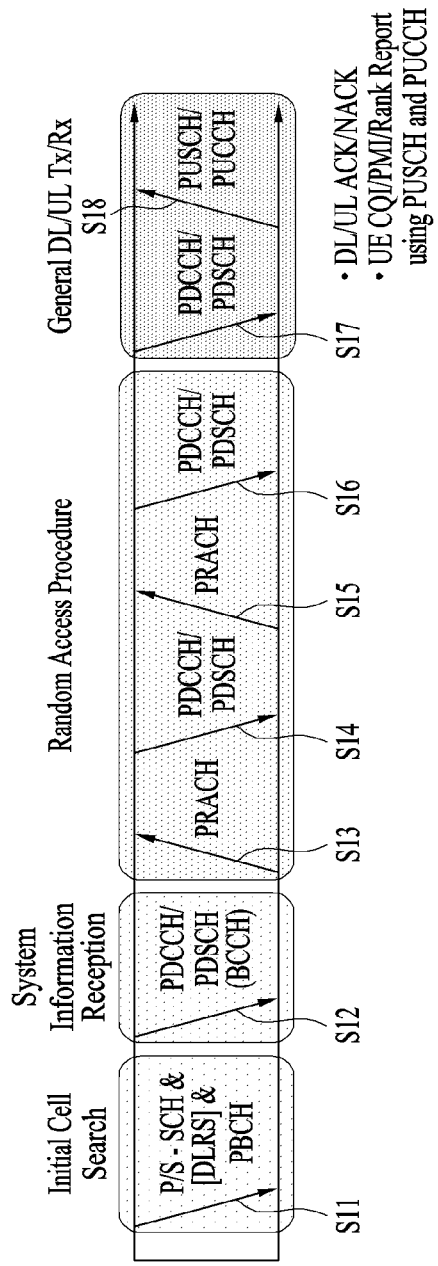
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
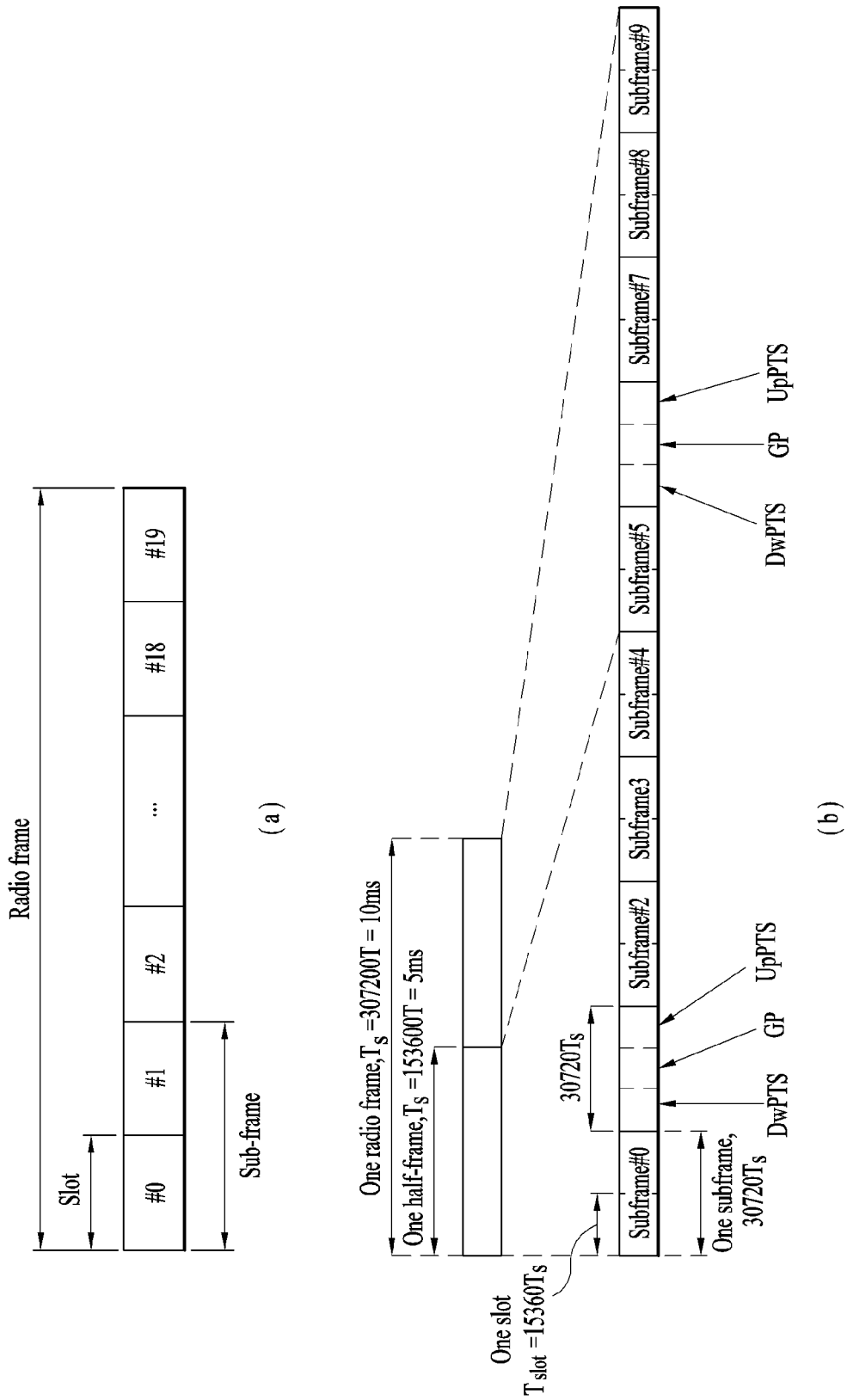
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
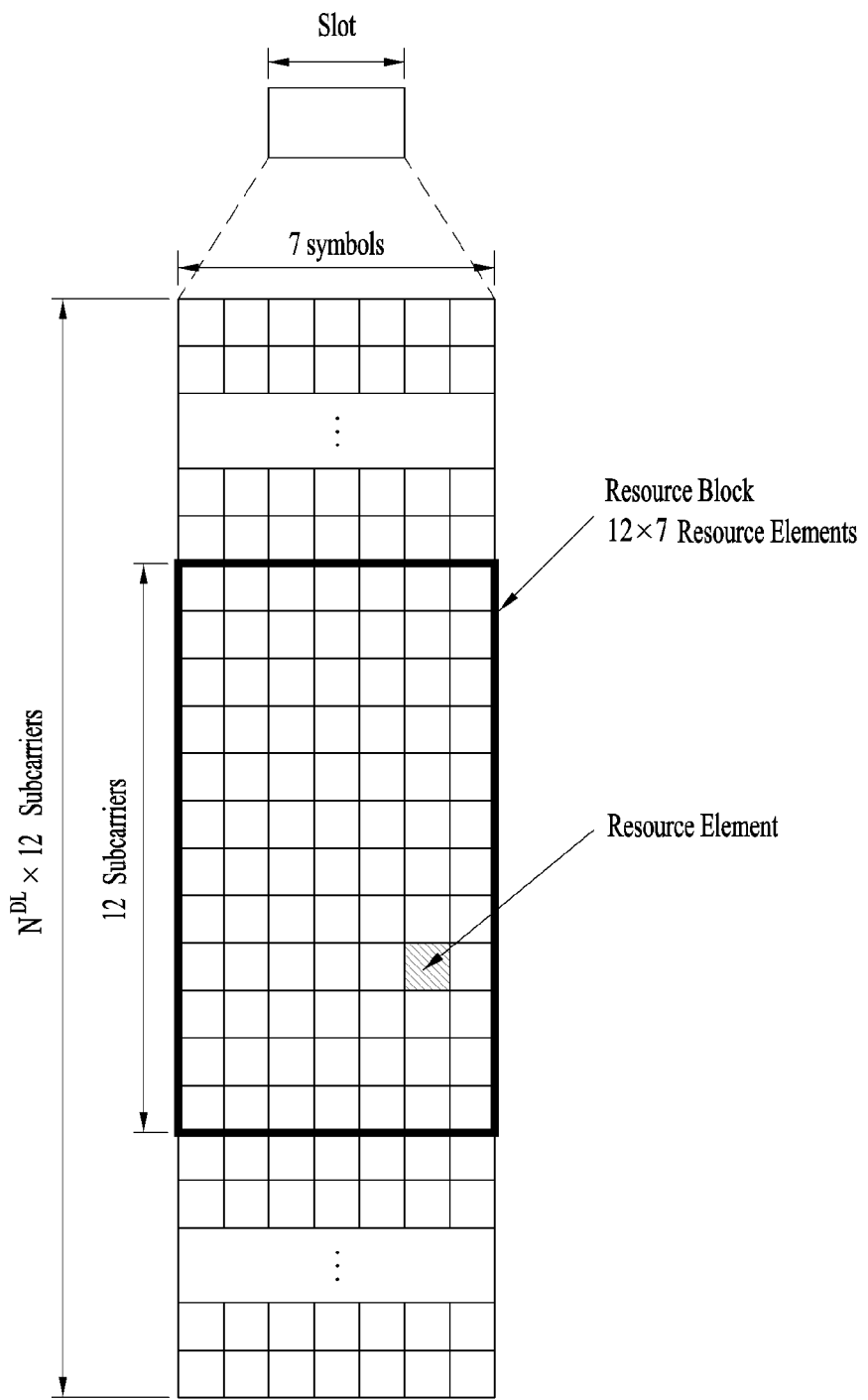
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
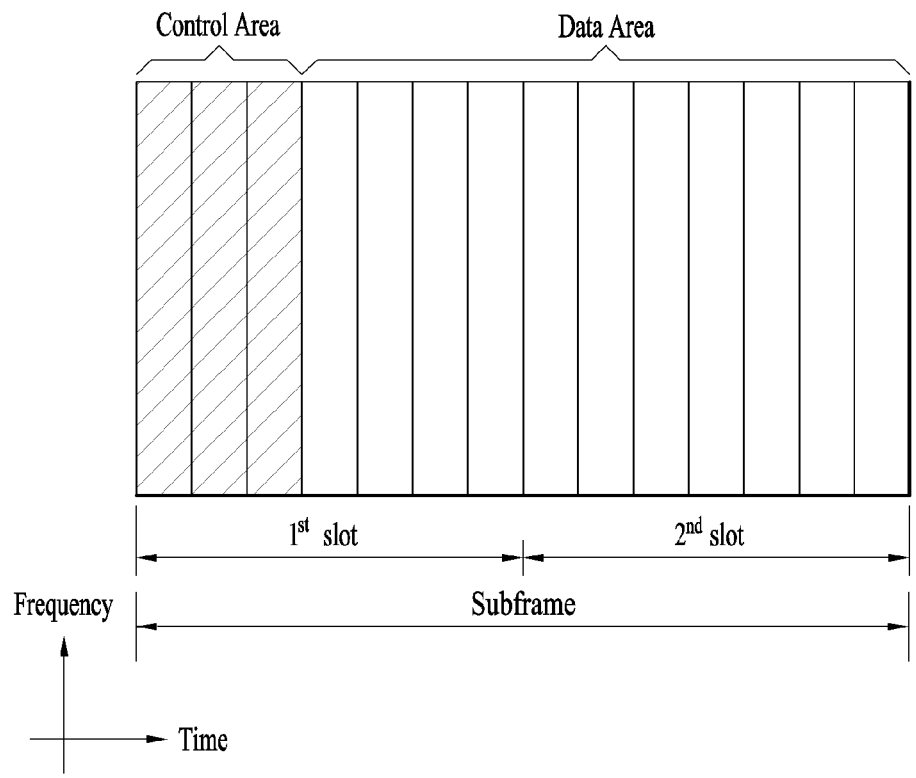
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e., group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
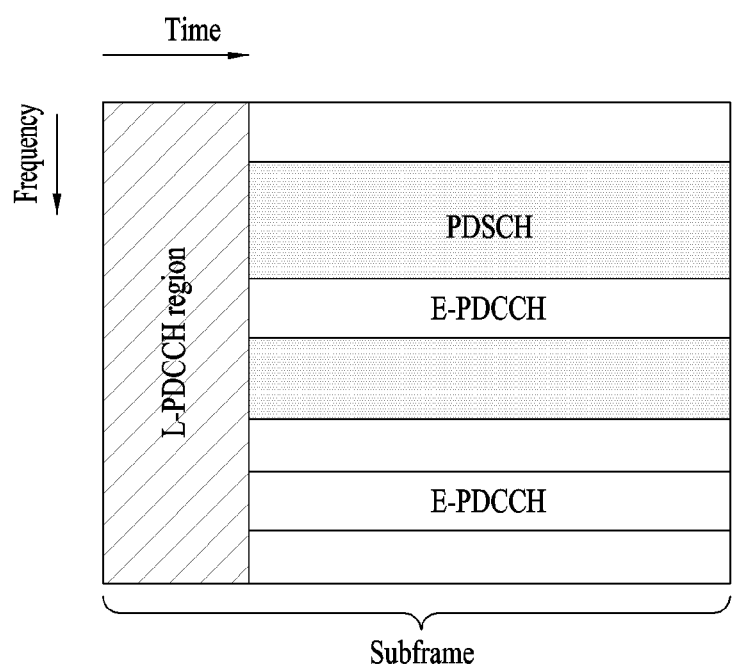
FIG. 5 illustrates an example of an enhanced physical downlink control channel (EPDCCH).

Transmission mode (TM)
 Transmission mode 1: Transmission from a single base station antenna port
 Transmission mode 2: Transmit diversity
 Transmission mode 3: Open-loop spatial multiplexing
 Transmission mode 4: Closed-loop spatial multiplexing
 Transmission mode 5: Multi-user MIMO (Multiple Input Multiple Output)
 Transmission mode 6: Closed-loop rank-1 precoding
 Transmission mode 7: Single-antenna port (ports) transmission
 Transmission mode 8: Double layer transmission (ports 7 and 8) or single-antenna port (port 7 or 8) transmission
 Transmission mode 9: Transmission through up to 8 layers (ports 7 to 14) or single-antenna port (port 7 or 8) transmission
DCI Format
 Format 0: Resource grants for PUSCH transmission
 Format 1: Resource assignments for single codeword PDSCH transmission (transmission modes 1, 2 and 7)
 Format 1A: Compact signaling of resource assignments for single codeword PDSCH (all modes)
 Format 1B: Compact resource assignments for PDSCH using rank-1 closed loop precoding (mod 6)
 Format 1C: Very compact resource assignments for PDSCH (e.g. paging/broadcast system information)
 Format 1D: Compact resource assignments for PDSCH using multi-user MIMO (mode 5)
 Format 2: Resource assignments for PDSCH for closed-loop MIMO operation (mode 4)
 Format 2A: Resource assignments for PDSCH for open-loop MIMO operation (mode 3)
 Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

In this specification, the PDCCH includes both L-PDCCH and EPDCCH unless otherwise noted.

FIG. 6 is a resource unit for constructing a control region. Referring to FIG. 6, an REG (denoted by a bold box) corresponds to 4 consecutive REs other than RSs R0 to R3, and a CCE may corresponds to 9 REs. Alternatively or additionally, an REG may be defined to include REs used for the RSs R0 to R3. That is, an REG may be defined by zero or more RS REs, and four consecutive REs except for the RSs R0 to R3, FIG. 7 is a flowchart illustrating a method for constructing a PDCCH by an eNode B.

Figure 7:
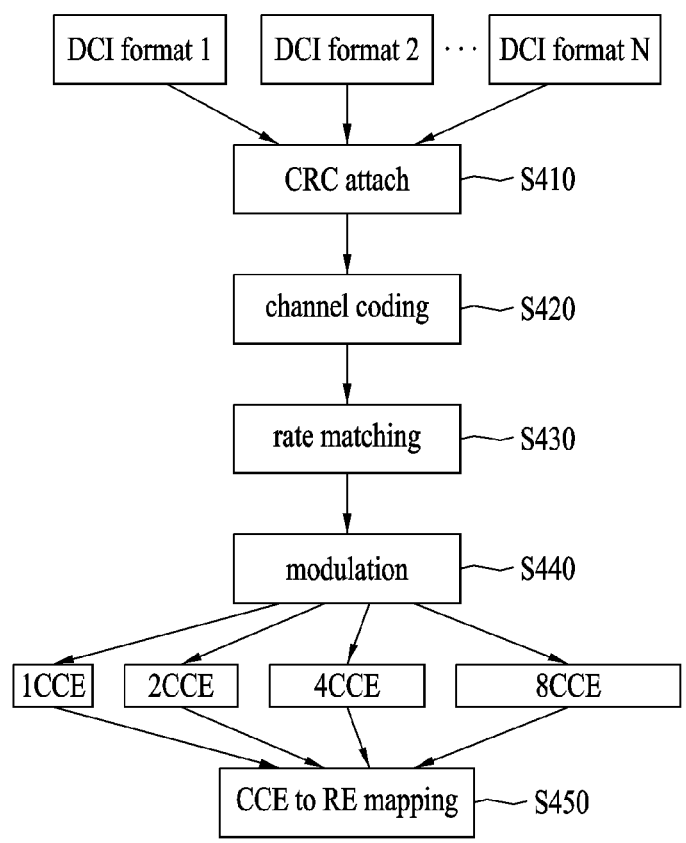
FIG. 7 is a flowchart illustrating a method for constructing a PDCCH by an eNode B.

Referring to FIG. 7, the eNode B generates control information according to a DCI format. The eNode B may select one of a plurality of DCI formats (i.e., DCI formats 1, 2, . . . , N) according to types of control information to be transmitted to the UE. In step S410, the eNode B attaches a cyclic redundancy check (CRC) for error detection to control information that is generated according to each DCI format. The CRC is masked with a Radio Network Temporary Identifier (RNTI) according to an owner or usage of the PDCCH.

In step S420, the control information to which the CRC is attached is subjected to channel coding so as to generate coded data. In step S430, rate matching according to a CCE aggregation level allocated to a PDCCH format is performed. In step S440, the coded data is modulated so as to generate modulated symbols. The modulated symbols configuring one PDCCH may have one of CCE aggregation levels of 1, 2, 4 and 8. In step S450, the modulated symbols (CCEs) are mapped to REs.

Figure 8:
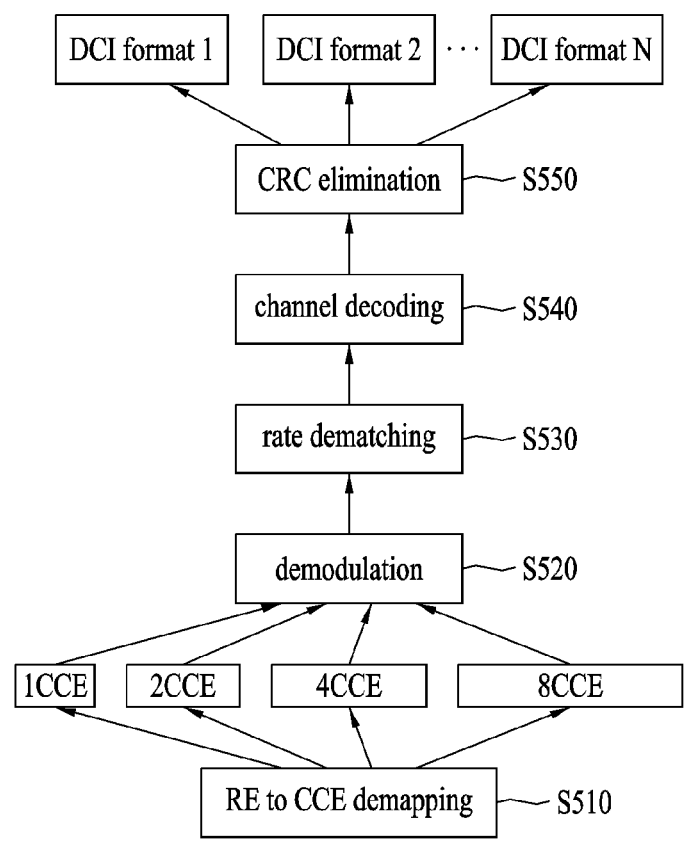
FIG. 8 is a flowchart illustrating a process for receiving a PDCCH by a user equipment (UE)

FIG. 8 is a flowchart illustrating a method of processing a PDCCH at a UE.

Referring to FIG. 8, in step S510, the UE demaps physical REs to CCEs. In step S520, since the UE is not aware of a CCE aggregation level, at which the UE receives a PDCCH, demodulation is performed with respect to the CCE aggregation levels. In step S530, the UE performs rate dematching with respect to the demodulated data. Since the UE is not aware of a DCI format (or a DCI payload size) of control information to be received, rate dematching is performed with respect to each DCI format (or each DCI payload size). In step S540, the data subjected to rate dematching is subjected to channel decoding according to a code rate and a CRC is checked to detect whether errors occur. If errors do not occur, it is determined that the UE detects a PDCCH thereof. If errors occur, the UE continues to perform BD with respect to other CCE aggregation levels or other DCI formats (or DCI payload sizes). In step S550, the UE which detects the PDCCH removes the CRC from the decoded data and acquires control information.

Figure 9:
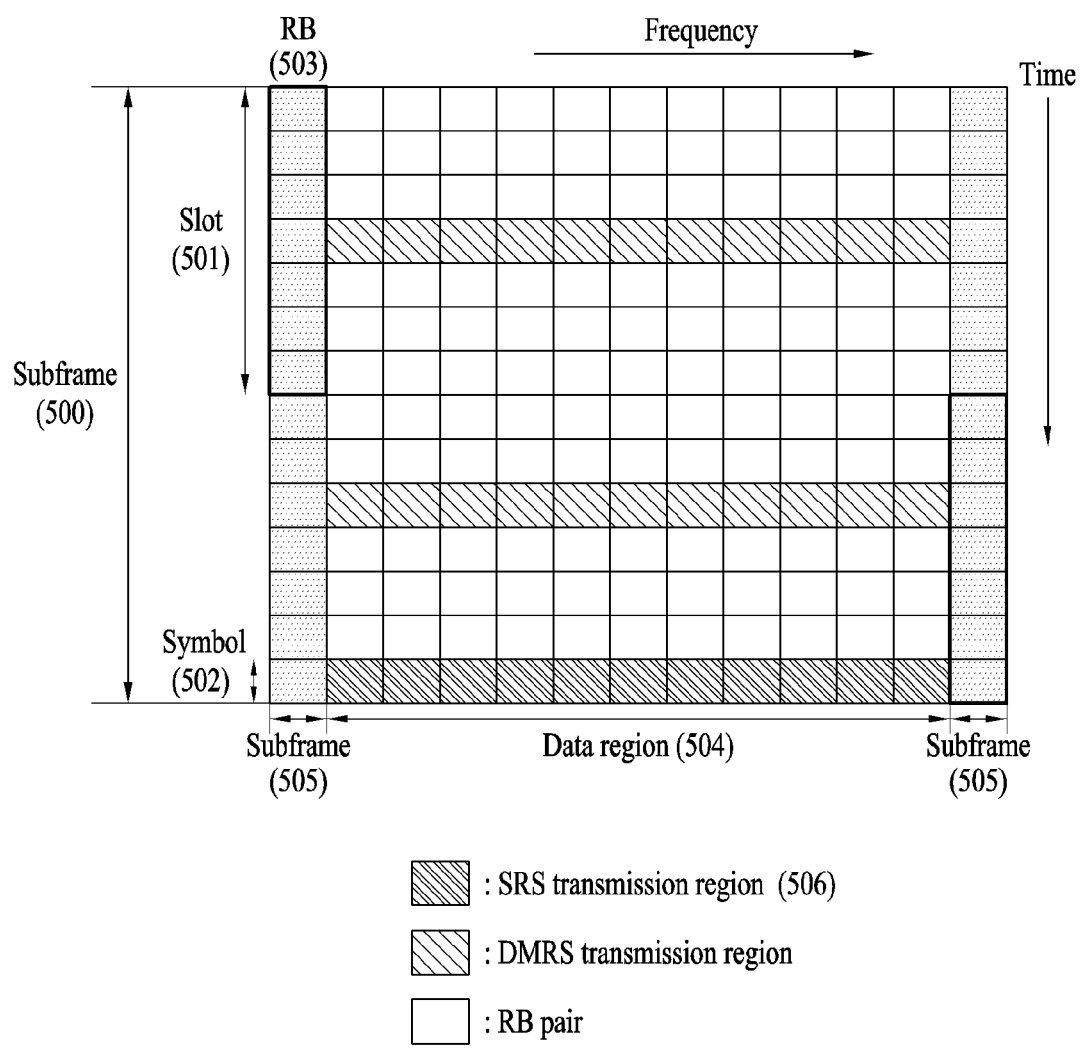
FIG. 9 illustrates the structure of an uplink subframe used in LTE(-A).

FIG. 9 illustrates a structure of an uplink subframe used in LTE(-A).

Referring to FIG. 9, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Scheduling for UL transmission in LTE is enabled only if UL transmission timing of a user equipment is synchronized. A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

Figure 10:
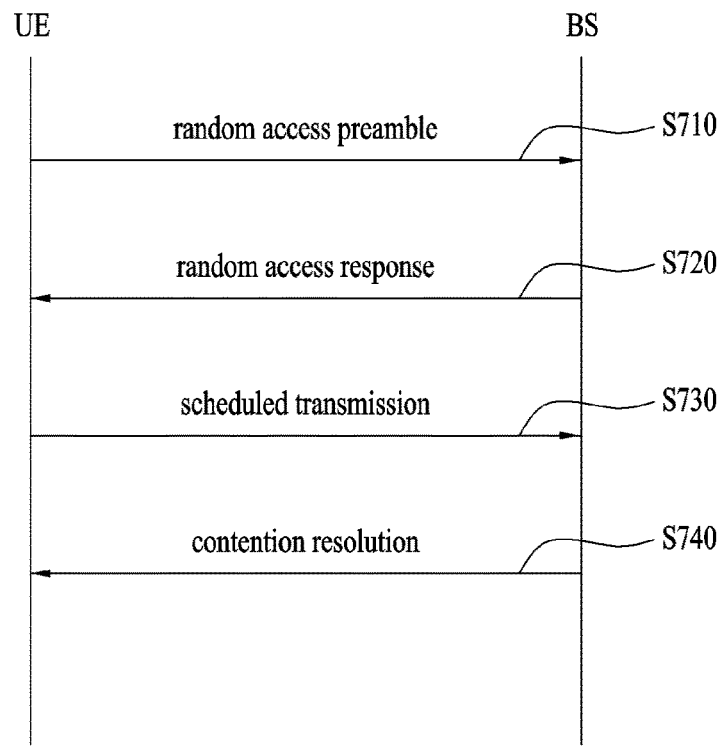
FIG. 10 and FIG. 11 illustrate examples of a random access procedure.

FIG. 10 is a diagram for one example of a contention based random access procedure.

Referring to FIG. 10, a user equipment receives information on a random access from a base station via system information. Thereafter, if the random access is required, the user equipment transmits a random access preamble (or a message 1) to the base station [S710]. Once the base station receives the random access preamble from the user equipment, the base station sends a random access response message (or, a message 2) to the user equipment [S720]. In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information [S730]. Having received the UL message from the user equipment in the step S730, the base station sends a contention resolution message (or, a message 4) to the user equipment [S740].

Figure 11:
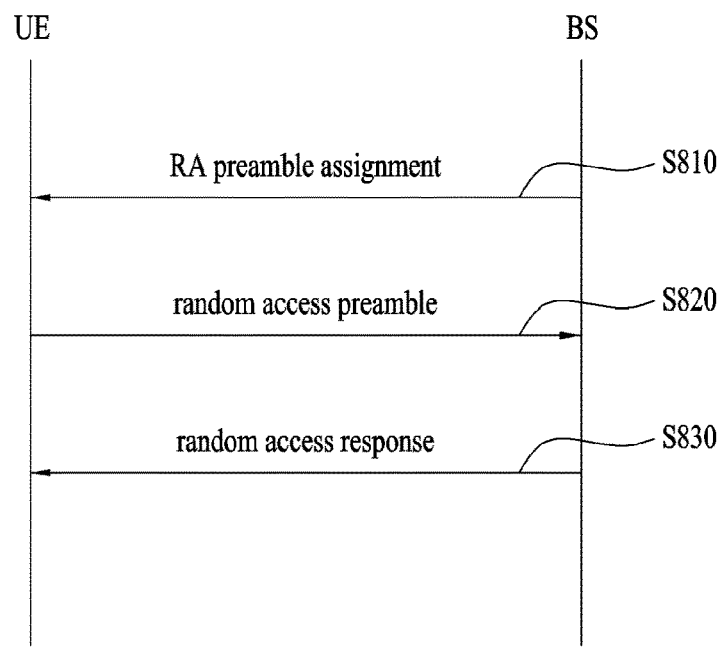

FIG. 11 is a diagram for one example of a non-contention based random access procedure. A non-contention based random access procedure may be used in a handover procedure or may exist if requested by an order given by a base station. A basic procedure is as good as a contention based random access procedure.

Referring to FIG. 11, a user equipment receives assignment of a random access preamble (i.e., a dedicated random access preamble) for the user equipment only from a base station [S810]. A dedicated random access preamble indication information (e.g., a preamble index) may be included in a handover command message or may be received on PDCCH. The user equipment transmits the dedicated random access preamble to the base station [S820]. Thereafter, the user equipment receives a random access response from the base station [S830] and the random access procedure is ended.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value '1' indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N_{RB}^{DL} (N_{RB}^{DL}+1)/2) \rceil$. Every bit is set to 1.

Preamble index: 6 bits

PRACH mask index: 4 bits

All the remaining bits for compact scheduling of PDSCH in DCI format 1A are set to 0.

Figure 12:
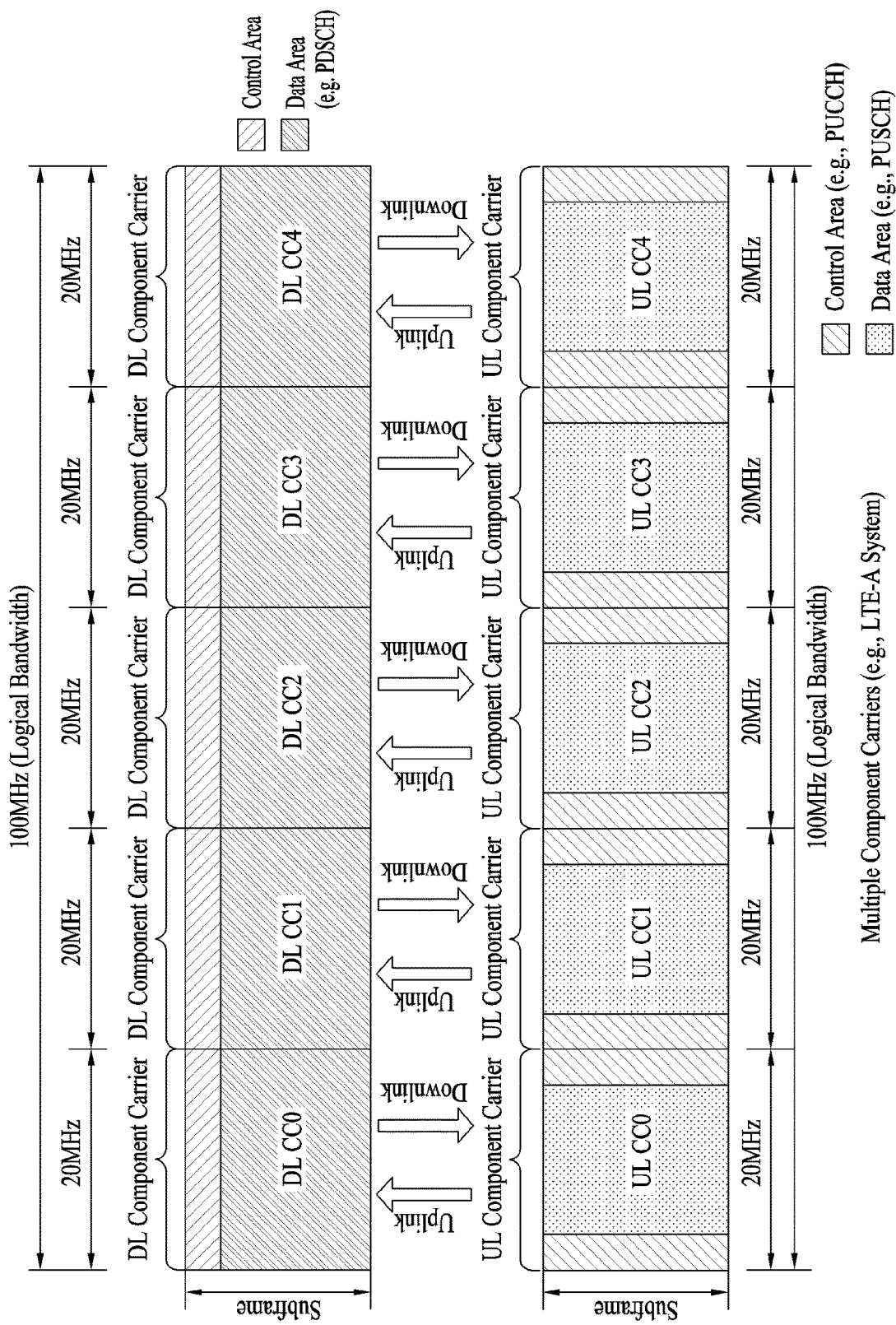
FIG. 12 illustrates a carrier aggregation (CA)-based wireless communication system.

FIG. 12 illustrates a carrier aggregation (CA) communication system.

Referring to FIG. 12, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 13:
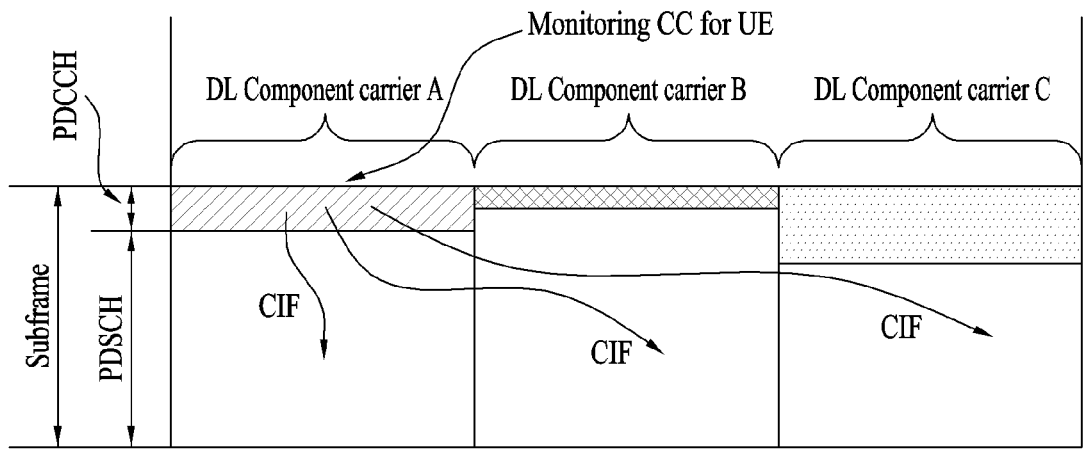
FIG. 13 illustrates cross-carrier scheduling.

FIG. 13 illustrates scheduling when a plurality of carriers are aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Furthermore, in a millimeter wave (mmW) system, a wavelength of a signal is short, so that a multitude of antennas can be installed in the same area. For example, since the wavelength is 1 cm in a 30 GHz band, a total of 100 antenna elements can be installed in a 5-by-5 cm2 panel in a form of a two-dimensional array with a 0.5λ (wavelength) spacing. Therefore, in the mmW system, a plurality of antenna elements are used to increase a beamforming (BF) gain to increase a coverage or increase a throughput.

In this connection, when each antenna element has a TXRU (transceiver unit) so that transmission power and phase can be adjusted for each antenna element, independent beamforming may be realized for each frequency resource. However, installing each TXRU in each of all 100 antenna elements is ineffective in terms of cost. Therefore, a scheme of mapping a plurality of antenna elements to one TXRU and adjusting a direction of the beam with an analog phase shifter is considered. This analog beamforming scheme may form only one beam direction in a full band, and has a disadvantage that a frequency selective beam cannot be achieved. Thus, as an intermediate form between digital BF and analog BF, a hybrid BF in which B TXRUs map to Q antenna elements (B<Q) may be considered. In this case, a number of directions of a beam in which the beam is simultaneously transmitted is limited to a number smaller than or equal to B, though it varies depending on a connection scheme between the B TXRUs and Q antenna elements.

Figure 14:
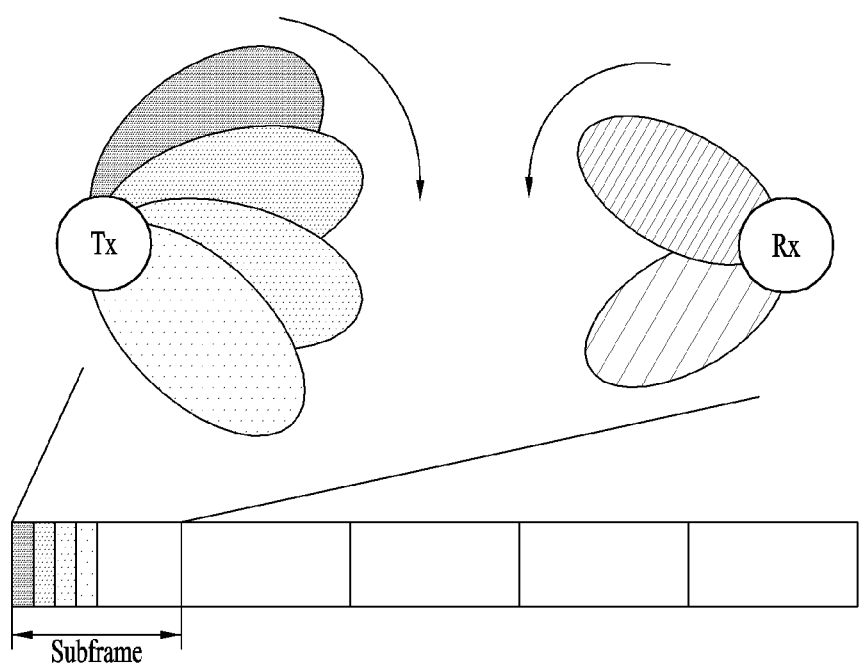
FIG. 14 illustrates analog beamforming.

FIG. 14 illustrates analog beamforming. Referring to FIG. 14, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

Figure 15:
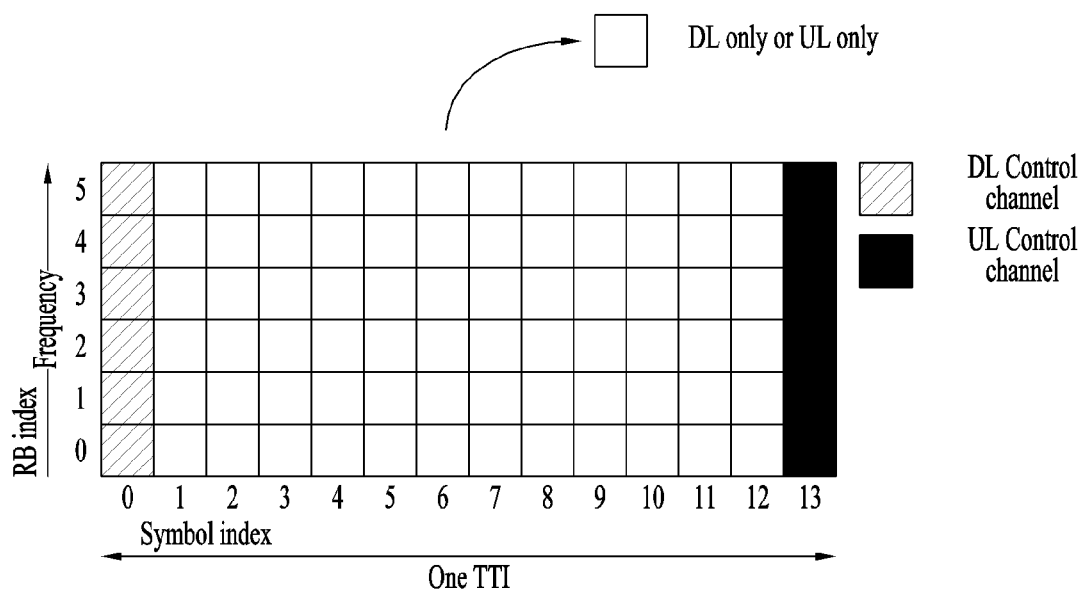
FIG. 15 illustrates a structure of a self-contained subframe.

In next-generation RAT (Radio Access Technology), a self-contained subframe is considered in order to minimize data transmission latency. FIG. 15 illustrates a self-contained subframe structure. In FIG. 15, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+ UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

EMBODIMENTS

The present disclosure proposes a method of configuring a search space (SS) and a control channel element (CCE), for transmitting a DL control channel (CCH) suitable for an operation in a new RAT system. Like the legacy PDCCH/EPDCCH, the DL CCH may be used to carry DCI from an eNB to a UE, such that the UE may perform various operations (e.g., DL/UL data transmission and power control) based on the DCI. First, terminologies are defined as follows.

1) Control region: A physical resource area in which the DL CCH is transmitted/received. The control region may be defined by an OFDM numerology (e.g., subcarrier spacing) and time/frequency resources (e.g., RB and subframe (SF) indexes), used in the control region. For example, the control region may be configured in symbol #0 of the subframe illustrated in FIG. 15. In this case, the control region may be configured across the entire frequency area of symbol #0 or in a part of the frequency area of symbol #0, and a different OFDM numerology from those of other symbols (e.g., all or a part of symbols #1 to #13) may be configured for the control region. Further, unlike the example of FIG. 15, the control region may be configured across a plurality of symbol durations in a subframe. Herein, a symbol may be any of an OFDM(A) symbol and an SC-FDM(A) symbol.

2) Search space (SS): An RE set (e.g., a CCE set) in which a DL CCH(s) (DL CCH candidate(s)) may be configured in the control region. To receive a DL CCH, a UE may monitor DL CCH candidates in an SS configured in the control region of each subframe. Herein, the monitoring includes blind decoding. The attributes of the SS may be defined by a CCE/DMRS mapping scheme used for CCH configuration/demodulation, a CCH transmission scheme, a seed value used for scrambling a CCH/DMRS signal, a CCE type, and so on.

[1] SS for DL CCH Transmission

One or more SSs may be configured in one control region, and two types of control regions may be defined in terms of the configurability of a subcarrier spacing (SCS) and a time/frequency (T/F) resource. For convenience, a non-configurable control region is referred to as control region A, and a configurable control region is referred to as control region B. Two types of SSs may also be defined in terms of the configurability of CCE/DMRS mapping, a CCH transmission scheme, a CCH/DMRS scrambling seed, a CCE type, and so on. For convenience, a non-configurable SS is referred to as SS A, and a configurable SS is referred to as SS B.

For example, SS A may be used for data scheduling involved in the process of reconfiguring a DL/UL transmission mode, parameters, and so on, including general unicast data scheduling, (and/or scheduling of broadcast data such as a system information block (SIB)/random access response (RAR), and paging involved in an initial random access procedure). There may be a mismatch between the UE and the eNB during the process, and thus the attributes of SS A may be configured as follows, such that SS A is suitable for a situation ambiguous (and/or unknown) to the UE.

1) CCE/DMRS mapping: Distributed mapping. A plurality of REs included in one CCE (and an associated DMRS) may be mapped/transmitted distributedly in a given control region. The distributed mapping may be performed on a CCE basis or a CCE-constituting smaller unit (e.g., REG) basis. For details, see later-described [2].

2) CCH transmission scheme: Space frequency block coding (SFBC). SFBC may be used as the CCH transmission scheme.

3) CCH/DMRS scrambling seed: A physical cell ID (PID). A PID may be used as a seed value used for scrambling a CCH (and an associated DMRS) signal. That is, the PID may be used as a seed value for initializing a scrambling sequences used for scrambling the CCH (and the associated DMRS) signal. A PID is used to identify the physical layer of an eNB, and given on an eNB basis. For example, the PID of each eNB is fixed to one of values 0 to 503. A PID is interchangeably used with an eNB ID.

4) CCE type: CCE type 1. For details, see later-described [3].

On the other hand, SS B may be used mainly for general unicast data scheduling (after RRC connection). Because there is no ambiguity caused by RRC reconfiguration or the like between the eNB and the UE (and/or the eNB is capable of determining the radio channel state and mobility of the UE), the following attributes may be configurable according to a UE situation. SS B may be configured by system information, an RAR (e.g., in step S720 of FIG. 10 and step S830 of FIG. 11), or message 4 (in step S740 of FIG. 10) (in an initial access procedure), or by UE-common or UE-specific signaling (e.g., an RRC message) (scheduled based on SS A).

1) CCE/DMRS mapping: Distributed and/or localized mapping. A plurality of REs included in one CCE (and an associated DMRS) may be mapped/transmitted in a distributed manner in a given control region and/or in a localized manner in a partial (frequency) area of the given control region.

2) CCH transmission scheme: SFBC and/or precoding. The CCH may be transmitted by SFBC and/or precoding.

3) CCH/DMRS scrambling seed: A virtual cell ID (VID). A VID may be used as a seed value for scrambling the CCH (and the associated DMRS) signal. A VID may be understood as information identifying a virtual cell/eNB. The VID may be set to a value equal to or different from the PID. The VID may have a value in the same range as that of the PID (e.g., one of 0 to 503), or in a wider range than that of the PID (e.g., one of 0 to N where N>503).

4) CCE type: CCE types 1, 2, and 3. For details, see later-described [3].

In another method, it may be configured that the attributes (e.g., CCE/DMRS mapping, CCH transmission scheme, CCH/DMRS scrambling seed, and CCE type) of SS A are wholly or partially configurable. For example, it may be configured that among the attributes of SS A, the CCE/DMRS mapping and the CCH transmission scheme are non-configurable, fixed respectively to {CCE/DMRA mapping: distributed mapping} and {CCH transmission scheme: SFBC}, whereas the CCH/DMRS scrambling seed and the CCE type are configurable, such as {CCH/DMRS scrambling seed: VID} and {CCE type: CCE types 1, 2, 3}. The configurable attributes of SS A may be configured by system information (e.g., SIB) (or RAR) (in an initial access procedure). The attributes of SS B may be configured by UE-common or UE-specific (e.g., RRC) signaling (scheduled based on SS A) (or an RAR or message 4).

There may be a need for a configuration that the UE should assume until before the UE receives configuration information about the attributes of SS B from the eNB, for example, a default configuration. In an example of the default configuration, with all of the attributes of SS A defined as non-configurable, the attributes of SS A, that is, {CCE/DMRS mapping: distributed mapping}, {CCH transmission scheme: SFBC}, and {CCH/DMRS scrambling seed: PID} are also applicable to SS B. In another example, with all or a part of the attributes of SS A defined as configurable, the attributes (including a non-configurable attribute) configured for SS A (e.g., {CCE/DMRS mapping: distributed mapping}, {CCH transmission scheme: SFBC}, and {CCH/DMRS scrambling seed: VID}) (see the previous paragraph) may still be applied to SS B.

SS A and SS B may be configured together in the same control region, and the control region may have the properties/attributes of control region A or control region B. In this case, SS A and SS B may be configured without overlap, with partial overlap, or with full overlap (between the RE sets of SS A and SS B).

Alternatively or additionally, only one of SS A and SS B may be configured in a specific control region, and both of SS A and SS B may be configured in another specific control region. For example, only SS A may be configured in control region A, and both of SS A and SS B may be configured in control region B. In another example, both of SS A and SS B may be configured in control region A, and only SS B may be configured in control region B.

A DMRS mapping scheme applied to a CCE may be differentiated according to the ratio between the number of control REs in one CCE (or CCH) and the number of DMRS REs used for demodulation of the CCE (or CCH) (or the number of REs used for DMRS transmission per specific frequency unit (e.g., per N contiguous subcarriers) and/or the number of antenna ports used for DMRS transmission. For example, if the number of control REs/the number of DMRS REs is less than a specific value, distributed mapping may be applied, and otherwise, localized (or one of localized mapping and distributed mapping) may be applied. Further, if the number of DMRS REs per N contiguous subcarriers is less than a specific value, distributed mapping may be applied, and otherwise, localized (or one of localized mapping and distributed mapping) may be applied. Further, if the number of DMRS antenna ports is less than a specific value, distributed mapping may be applied, and otherwise, localized (or one of localized mapping and distributed mapping) may be applied.

[2] CCE Structure for DL CCH

Before a proposed CCE structure for a DL CCH (e.g., an RE mapping pattern for a CCE) is described, terminologies are defined as follows.

1) Control REG (c-REG): A basic resource unit that constitutes a CCE. One CCE may include a plurality of c-REGs. One c-REG may include N contiguous REs in frequency (in one symbol). A symbol is any of an OFDM(A) symbol and an SC-FDM(A) symbol. A c-REG may include N contiguous REs except for a DMRS, or N contiguous REs including the DMRS. In the latter case, the c-REG may include zero or more (DM)RSs. N is an integer equal to or larger than 2, for example, 4.

2) Bundled REG (b-REG): An REG to which the same precoding is applied. One b-REG may include M contiguous REs in frequency (in one symbol). A symbol may be any of an OFDM(A) symbol and an SC-FDM(A) symbol. A b-REG may include M contiguous REs except for a DMRS, or M contiguous REs including the DMRS. In the latter case, the b-REG may include zero or more (DM)RSs. M is an integer equal to or larger than 2, defined based on the c-REG size N. For example, the b-REG size M may be defined as a multiple of the c-REG size N (e.g., M=L*N). L is defined as an integer equal to or larger than 1. L may be indicated to the UE through higher-layer signaling (e.g., RRC signaling) by the eNB. Further, L may be predefined based on a system band/the size (e.g., frequency band) of a control region/the size (e.g., the number of CCEs) of an SS. For example, as the system band/the size of the control region/the size of the SS is larger, L may also be set to a larger value.

On the assumption that one CCE includes K c-REGs, CCE structures are proposed below according to REG mapping patterns. K is an integer equal to or larger than 2. The following proposal is described with the appreciation that one CCE includes P b-REGs, and the b-REG size M is a multiple of the c-REG size N, which should not be construed as limiting the present disclosure. P is an integer equal to or larger than 1.

1) Distributed CCE

A. Opt 1 (N<M): The c-REG size is less than the b-REG size, and L(=M/N) c-REGs are mapped to each b-REG. K c-REGs included in one CCE are (sequentially/distributedly) mapped to P(=K/L) b-REGs, and the P(=K/L) b-REGs are arranged/mapped distributedly in a control region.

B. Opt 2 (N=M): The c-REG size is equal to the b-REG size, and one c-REG is mapped to each b-REG. K c-REGs included in one CCE are mapped to K b-REGs, and the K b-REGs are arranged/mapped distributedly in a control region.

2) Localized CCE

A. Opt 1 (N<M): The c-REG size is less than the b-REG size, and L(=M/N) c-REGs are mapped to each b-REG. K c-REGs included in one CCE are (sequentially/distributedly) mapped to P(=K/L) b-REGs, and the P(=K/L) b-REGs are arranged/mapped in a localized manner in a control region.

B. Opt 2 (N=M): The c-REG size is equal to the b-REG size, and one c-REG is mapped to each b-REG. K c-REGs included in one CCE are mapped to K b-REGs, and the K b-REGs are arranged/mapped in a localized manner in a control region.

[3] CCE Differentiation for DL CCH

In the new RAT system, an eNB is highly likely to perform a multi-beam operation based on transmission/reception (TX/RX) (analog or hybrid) beamforming (BF) for DL/UL signal transmission/reception, relying on the mmW property of a high frequency band. In this case, in view of the nature of analog BF, the eNB may transmit a DL signal in one OFDM symbol only in one specific beam direction. Accordingly, in order to transmit the DL signal in different beam directions, it is necessary to configure the DL signal in TDM on a symbol (group) basis.

Further, the new RAT system should be designed so as to support various use scenarios (service types or traffic types), such as enhanced mobile broadband (eMBB), ultra-reliable low-latency communication (URLLC), and massive machine type communication (mMTC). Each use scenario (for convenience, referred to as use case) may have a different requirement for (user-plane) latency. For example, the (maximum) latency requirements of the respective use cases are given in the order of URLLC (e.g., 0.5 ms)<eMBB (e.g., 4 ms)<mMTC (e.g., X ms>4 ms).

Therefore, a method of differently mapping REs included in a CCE/CCH and an associated DMRS according to whether an analog BF-based multi-beam operation is performed and use case type-based latency requirements, based on the characteristics of the new RAT system is proposed. It is assumed that a time period used/configured for CCH transmission (for convenience, referred to as a control duration) includes a plurality of symbols. The symbols include an OFDM(A) symbol and an SC-FDM(A) symbol. A period (for convenience, referred to as a data duration) other than the control duration in a subframe may include one or more symbols.

1) When a multi-beam operation is applied=>"CCE type 1"

A. One CCE and/or one CCH (REs included in the CCE and/or CCH) may be mapped only to one symbol, and a DMRS associated with the CCE and/or CCH may also be mapped only to one symbol (identical to the symbol to which the CCE/CCH is mapped). A signal transmission in each symbol corresponds to a different beam direction, and the UE may receive a signal in a beam direction suitable for the UE (see FIG. 14).

B. The same c-REG and/or CCE mapping pattern may be used in each symbol.

2) When a multi-beam operation is not applied=>"CCE type 2"

A. One CCE and/or one CCH (REs included in the CCE and/or CCH) may be mapped across all plural symbols in a control duration, and a DMRS associated with the CCE and/or CCH may be mapped only to one specific symbol (e.g., the first symbol of the control duration). A signal transmission in each symbol corresponds to the same beam direction, and the UE may receive all symbols in the control duration.

B. A c-REG mapping pattern in one specific symbol (e.g., the first symbol of a control duration) may be different from a c-REG mapping pattern in the other symbols.

3) When low latency is required (without a multi-beam operation) (e.g., URLLC)=>"CCE type 3"

A. One CCE and/or one CCH (REs included in the CCE and/or CCH) may be mapped only to one symbol, and a DMRS associated with the CCE and/or CCH may also be mapped only to one symbol (e.g., the first symbol of a control duration).

B. A c-REG and/or CCE mapping pattern in a specific symbol (e.g., the first symbol of a control duration) may be different from a c-REG and/or CCE mapping pattern in the other symbols.

4) When low latency is not required (without a multi-beam operation) (e.g., eMBB)=>"CCE type 2"

A. One CCE and/or one CCH (REs included in the CCE and/or CCH) may be mapped across all plural symbols in a control duration, and a DMRS associated with the CCE and/or CCH may be mapped only to one specific symbol (e.g., the first symbol of the control duration).

B. A c-REG mapping pattern in one specific symbol (e.g., the first symbol of a control duration) may be different from a c-REG mapping pattern in the other symbols.

When it is said that c-REG/CCE mapping patterns are identical or different, this may mean that a combination of the (frequency) indexes of REs included in each G-REG/CCE and/or the number of REs included in a single c-REG/CCE is the same or different.

In the case of CCE type 1/2/3, which one of the three CCE types to be applied may be automatically configured according to whether a multi-beam operation is performed and/or a latency requirement, configured by system information, an RAR (in step S720 of FIG. 10 or S830 of FIG. 11), or message 4 (e.g., in step S740 of FIG. 10) (in an initial access procedure), or configured by UE-common or UE-specific (RRC) signaling. Further, a CCE type to be applied to SS B may be configured by specific UE-common or UE-specific signaling (e.g., an RRC message) scheduled based on SS A.

There may be a need for a CCE type based on which the UE is to operate until before receiving configuration information indicating a CCE type to be used among CCE types 1, 2, and 3 from the eNB, that is, a default CCE type, for example. Characteristically, CCE type 1 may be set as the default CCE type.

Figure 16:
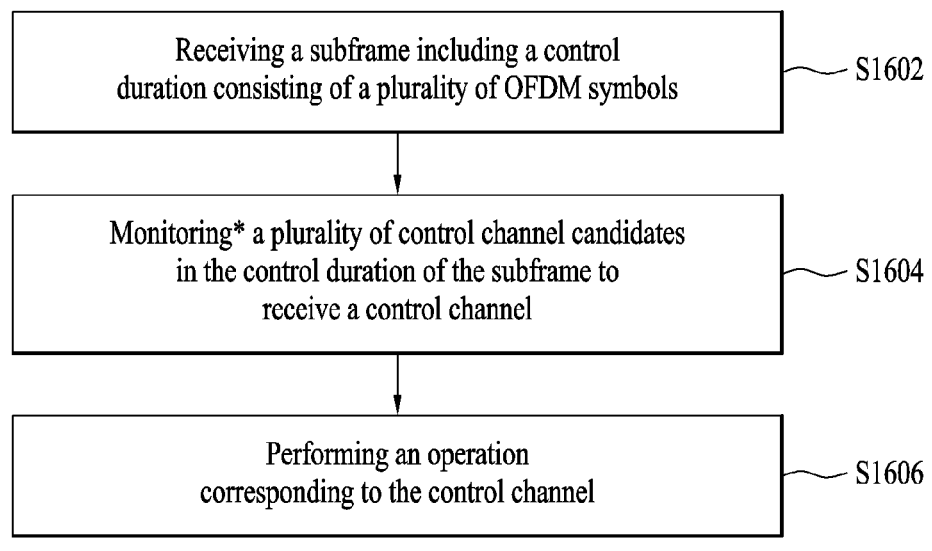
FIG. 16 illustrates an exemplary signal reception procedure according to the present disclosure. (기존 영문이 공보와 달라 수정힘)

FIG. 16 is an exemplary view illustrating a signal reception procedure according to the present disclosure.

Referring to FIG. 16, after receiving a subframe having a control duration that spans a plurality of OFDM symbols (S1602), a UE may receive a control channel by monitoring a plurality of control channel candidates in the control duration of the subframe (S1604). Then, the UE may perform an operation corresponding to the received control channel (S1606). For example, the UE may receive a DL shared channel (e.g., a PDSCH) or transmit a UL shared channel (e.g., a PUSCH) according to scheduling information of the control channel. Further, the UE may control the transmission power of a UL signal (e.g., a PUSCH or PUCCH) according to power control information of the control channel. If the plurality of OFDM symbols in the control duration correspond to multiple beam directions, a plurality of control channel resources included in each control channel candidate may exist only in the same OFDM symbol within the control duration (e.g., CCE type 1). On the other hand, if the plurality of OFDM symbols in the control duration correspond to a single beam direction, the plurality of control channel resources included in each control channel candidate may exist across the plurality of OFDM symbols in the control duration (e.g., CCE type 2).

Information about the beam directions of the plurality of OFDM symbols may be received from an eNB, and the UE may monitor the plurality of control channel candidates under the assumption that the plurality of OFDM symbols in the control duration correspond to multiple beam directions, until before receiving the information. The information may be received by system information, an RAR, or an RRC signal.

The plurality of control channel resources in each control channel candidate may include a plurality of c-REGs, each c-REG including a plurality of consecutive REs in one OFDM symbol. The plurality of c-REGs may be precoded on a b-REG basis, and the size of a c-REG may be less than the size of a b-REG. Further, each control channel candidate may be distributed on a b-REG basis in the control region.

Figure 17:
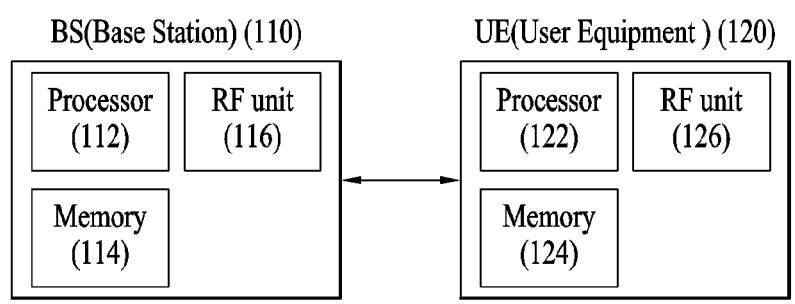
FIG. 17 illustrates a base station and a user equipment applicable to an embodiment of the present disclosure.

FIG. 17 illustrates a BS and a UE of a wireless communication system, which are applicable to embodiments of the present invention.

Referring to FIG. 17, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of receiving a signal at a user equipment (UE) in a wireless communication system, the method comprising:
receiving a subframe having a control duration spanning a plurality of orthogonal frequency division multiplexing (OFDM) symbols;
receiving a control channel by monitoring a plurality of control channel candidates in the control duration of the subframe; and
performing an operation corresponding to the control channel,
wherein if the plurality of OFDM symbols correspond to multiple beam directions, a plurality of control channel resources configuring respective control channel candidates exist only in the same OFDM symbol within the control duration, and if the plurality of OFDM symbols correspond to a single beam direction, the plurality of control channel resources configuring respective control channel candidates exist across the plurality of OFDM symbols in the control duration.

2. The method according to claim 1, wherein information about beam directions of the plurality of OFDM symbols is received from a base station (BS), and the plurality of control channel candidates are monitored on the assumption that the plurality of OFDM symbols correspond to multiple beam directions, until before the information is received.

3. The method according to claim 2, wherein the information is received in system information, a random access response (RAR), or a radio resource control (RRC) signal.

4. The method according to claim 1, wherein the plurality of control channel resources configuring respective control channel candidates include a plurality of control resource element groups (c-REGs), and each of the c-REGs includes a plurality of consecutive resource elements (REs) in one OFDM symbol.

5. The method according to claim 4, wherein the plurality of c-REGs are precoded on a bundled REG (b-REG) basis, and the size of a c-REG is less than the size of a b-REG.

6. The method according to claim 5, wherein each of the control channel candidates is distributed on a b-REG basis in the control region.

7. A user equipment (UE) in a wireless communication system, the UE comprising:
a radio frequency (RF) module; and
a processor,
wherein the processor is configured to receive a subframe having a control duration spanning a plurality of orthogonal frequency division multiplexing (OFDM) symbols, to receive a control channel by monitoring a plurality of control channel candidates in the control duration of the subframe, and to perform an operation corresponding to the control channel, and
wherein if the plurality of OFDM symbols correspond to multiple beam directions, a plurality of control channel resources configuring respective control channel candidates exist only in the same OFDM symbol within the control duration, and if the plurality of OFDM symbols correspond to a single beam direction, the plurality of control channel resources configuring respective control channel candidates exist across the plurality of OFDM symbols in the control duration.

8. The UE according to claim 7, wherein information about beam directions of the plurality of OFDM symbols is received from a base station (BS), and the plurality of control channel candidates are monitored on the assumption that the plurality of OFDM symbols correspond to multiple beam directions, until before the information is received.

9. The UE according to claim 8, wherein the information is received in system information, a random access response (RAR), or a radio resource control (RRC) signal.

10. The UE according to claim 7, wherein the plurality of control channel resources configuring respective control channel candidates include a plurality of control resource element groups (c-REGs), and each of the c-REGs includes a plurality of consecutive resource elements (REs) in one OFDM symbol.

11. The UE according to claim 10, wherein the plurality of c-REGs are precoded on a bundled REG (b-REG) basis, and the size of a c-REG is less than the size of a b-REG.

12. The UE according to claim 11, wherein each of the control channel candidates is distributed on a b-REG basis in the control region.

* * * * *